United States Patent
Miyake et al.

(10) Patent No.: US 9,569,353 B2
(45) Date of Patent: Feb. 14, 2017

(54) AUTOMOTIVE ELECTRONIC CONTROL UNIT AND DATA REWRITING METHOD FOR AUTOMOTIVE ELECTRONIC CONTROL UNIT

(71) Applicant: HITACHI AUTOMOTIVE SYSTEMS, LTD., Hitachinaka-shi, Ibaraki (JP)

(72) Inventors: Toshifumi Miyake, Isesaki (JP); Yusuke Abe, Isesaki (JP); Koji Yuasa, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 255 days.

(21) Appl. No.: 13/845,940

(22) Filed: Mar. 18, 2013

(65) Prior Publication Data

US 2013/0254469 A1 Sep. 26, 2013

(30) Foreign Application Priority Data

Mar. 21, 2012 (JP) .................. 2012-063833

(51) Int. Cl.
*G06F 12/00* (2006.01)
*G06F 13/00* (2006.01)
(Continued)

(52) U.S. Cl.
CPC ........... *G06F 12/0246* (2013.01); *G06F 8/665* (2013.01); *G06F 2212/7207* (2013.01)

(58) Field of Classification Search
CPC .. G06F 8/665; G06F 12/0246; G06F 12/0804; G06F 12/0866; G08C 17/00; G08C 17/02; H04L 1/24; H04L 5/00; H04L 9/00; H04L 9/08; H04L 9/3215; H04L 12/18; H04L 12/184; H04L 12/185; H04L 12/189; H04L 12/1881; H04L 12/4641; H04L 29/12292; H04L 41/08; H04L 41/28; H04L 45/16; H04L 47/15; H04L 47/806; H04L 49/201; H04L 49/203; H04L 63/00; H04L 63/04; H04L 65/80; H04L 67/04; H04L 2012/5641; H04L 2012/6416; H04W 4/00; H04W 4/02; H04W 4/06; H04W 4/08; H04W 8/005; H04W 12/00; H04W 12/02; H04W 12/04; H04W 24/00; H04W 24/02; H04W 28/00; H04W 28/06; H04W 72/00; H04W 72/04; H04W 76/00; H04W 84/18; H04W 88/00; H04W 88/06
(Continued)

(56) References Cited

U.S. PATENT DOCUMENTS 4,660,170 A * 4/1987 Hui .................. G06F 8/665 710/316
4,677,558 A * 6/1987 Bohmler ............. F02D 41/2409 701/101

(Continued)

FOREIGN PATENT DOCUMENTS

CN 101060427 A * 10/2007 .......... H04L 12/24
JP 2010-19175 A * 7/2008 .......... F02D 45/00
(Continued)

OTHER PUBLICATIONS

Unicast, Broadcast, and Multicast, Gorry Fairhurst, Oct. 3, 2009, retrieved from http://www.erg.abdn.ac.uk/users/gorry/course/intro-pages/uni-b-mcast.html on Jan. 13, 2015 (3 pages).*
(Continued)

*Primary Examiner* — Daniel C Chappell
(74) *Attorney, Agent, or Firm* — Foley & Lardner LLP

(57) ABSTRACT

An automotive electronic control unit receives rewrite data wirelessly transmitted in units of a predetermined size from an external device and rewrites data stored in a nonvolatile
(Continued)

memory based on the rewrite data. At this time, the rewrite data is communicated by switching between broadcast communication and unicast communication, or between multicast communication and unicast communication.

21 Claims, 8 Drawing Sheets

(51) Int. Cl.
   *G06F 13/28* (2006.01)
   *G06F 12/02* (2006.01)
   *G06F 9/445* (2006.01)

(58) Field of Classification Search
   USPC .................................................. 711/154–166
   See application file for complete search history.

(56) References Cited

U.S. PATENT DOCUMENTS

| | | | | |
|---|---|---|---|---|
| 5,699,275 A | * | 12/1997 | Beasley | G06F 8/65 709/221 |
| 5,896,566 A | * | 4/1999 | Averbuch | G06F 8/65 455/419 |
| 6,182,190 B1 | * | 1/2001 | Nakamoto | G06F 8/665 365/185.24 |
| 6,615,404 B1 | * | 9/2003 | Garfunkel | G06F 8/665 717/173 |
| 6,760,017 B1 | * | 7/2004 | Banerjee | H04L 29/12009 340/12.54 |
| 7,965,680 B2 | * | 6/2011 | Jhamnani | H04W 72/005 370/238 |
| 8,924,952 B1 | * | 12/2014 | Hou | G06F 8/665 710/1 |
| 8,972,970 B2 | * | 3/2015 | Chang | G06F 8/665 717/170 |
| 9,069,641 B2 | * | 6/2015 | Parry | G06F 8/65 |
| 9,092,299 B2 | * | 7/2015 | Coolidge | G06F 8/65 |
| 9,110,678 B1 | * | 8/2015 | Chan | G06F 9/4401 |
| 9,301,164 B2 | * | 3/2016 | Lin | G06F 8/65 |
| 9,311,072 B2 | * | 4/2016 | Chen | G06F 8/65 |
| 9,342,445 B2 | * | 5/2016 | Moshayedi | G06F 12/0246 |
| 2003/0007641 A1 | * | 1/2003 | Kinoshita | H04L 63/04 380/270 |
| 2003/0084434 A1 | * | 5/2003 | Ren | G06F 8/65 717/172 |
| 2003/0134655 A1 | * | 7/2003 | Chen | H04L 12/1877 455/522 |
| 2003/0143952 A1 | * | 7/2003 | Haller | H01M 10/48 455/41.2 |
| 2004/0002793 A1 | * | 1/2004 | Tachibana | G11C 16/102 701/1 |
| 2004/0225817 A1 | * | 11/2004 | Wang | H04L 12/4633 710/305 |
| 2007/0123226 A1 | * | 5/2007 | Liang | G06F 21/6218 455/414.1 |
| 2009/0059832 A1 | * | 3/2009 | Jhamnani | H04W 72/005 370/312 |
| 2009/0082049 A1 | * | 3/2009 | Song | H04L 12/189 455/518 |
| 2010/0179720 A1 | * | 7/2010 | Lin | G07C 5/008 701/31.4 |
| 2010/0257295 A1 | * | 10/2010 | Nielsen | H04L 12/2821 710/110 |
| 2013/0073799 A1 | * | 3/2013 | Abe | F02D 41/249 711/103 |
| 2016/0232010 A1 | * | 8/2016 | Dicks | G06F 8/63 |

FOREIGN PATENT DOCUMENTS

| | | | |
|---|---|---|---|
| JP | 2010-019175 A | | 1/2010 |
| JP | 2010019175 A | * | 1/2010 |
| JP | 2010-028636 A | | 2/2010 |
| JP | 2011-057160 A | | 3/2011 |

OTHER PUBLICATIONS

Machine translation of JP 2010-19175, AIPN (15 pages).*
Machine translation of CN 101060427A, retrieved from https://patents.google.com/patent/CN101060427A/en?q=broadcast&q=unicast&q=software&q=version on Jul. 24, 2015 (22 pages).*
Performance Evaluation of Mobile Multicast Session Initialization Techniques for Remote Software Upload in Vehicle ECUs, Hossain et al, 2010 IEEE 72nd Vehicular Technology Conference Fall (VTC 2010-Fall), Sep. 6-9, 2010, pp. 1-5 (5 pages).*
Unicast Broadcast Multicast Ethernet MAC Address, Gorry Fairhurst, Oct. 3, 2009, retrieved from http://www.erg.abdn.ac.uk/users/gorry/course/intro-pages/uni-b-mcast.html on Jan. 13, 2015 (3 pages).*
Machine translation of JP 2010-019175A (15 pages).*
A DECOMSYS based tool-chain for analyzing FlexRay based automotive control applications; Goswami et al; Proceedings of the fifth annual IEEE international conference on Automation science and engineering; Aug. 22, 2009; pp. 403-408 (6 pages).*
A model for safe and secure execution of downloaded vehicle applications; Phung et al; Road Transport Information and Control Conference and the ITS United Kingdom Members' Conference (RTIC 2010)—Better transport through technology, IET; May 25-27, 2016 (6 pages).*

* cited by examiner

AUTOMOTIVE ELECTRONIC CONTROL UNIT AND DATA REWRITING METHOD FOR AUTOMOTIVE ELECTRONIC CONTROL UNIT

BACKGROUND OF THE INVENTION

1. Field of the Invention

The present invention relates to a technique for rewriting data on an in-vehicle electronic control unit.

2. Description of Related Art

In an in-vehicle electronic control unit, for example, data such as programs and control parameters stored in a nonvolatile memory, such as an EEPROM (Electrically Erasable Programmable Read Only Memory) or a flash ROM (Read Only Memory), sometimes needs to be rewritten due to functional updating or the like. Therefore, as described in Japanese Laid-Open (Kokai) Patent Application Publication No. 2010-19175, there is proposed a technique in which rewrite data is transmitted wirelessly from a rewriting tool to multiple vehicles to rewrite data on an electronic control unit in each of the vehicles that received the rewrite data.

Among vehicles of different specifications, only part of the data structure in electronic control units may be different, such as a case in which control parameters are different but the program is the same in the electronic control units. Since the conventional technique assumes that the data structure is the same in electronic control units, data in electronic control units having data structures different only in part cannot be rewritten concurrently. Therefore, data rewriting has to be performed on each group of vehicles with electronic control units having a same data structure, resulting in inefficient data rewriting.

SUMMARY OF THE INVENTION

An automotive electronic control unit receives rewrite data wirelessly transmitted in units of a predetermined size from an external device, and rewrites data stored in a nonvolatile memory based on the rewrite data. At this time, the rewrite data is communicated by switching between broadcast communication and unicast communication, and between multicast communication and unicast communication.

Other objects and features of aspects of this invention will be understood from the following description with reference to the accompanying drawings.

DESCRIPTION OF EMBODIMENT

An embodiment for carrying out the present invention will now be described in detail with reference to the accompanying drawings.

Figure 1:
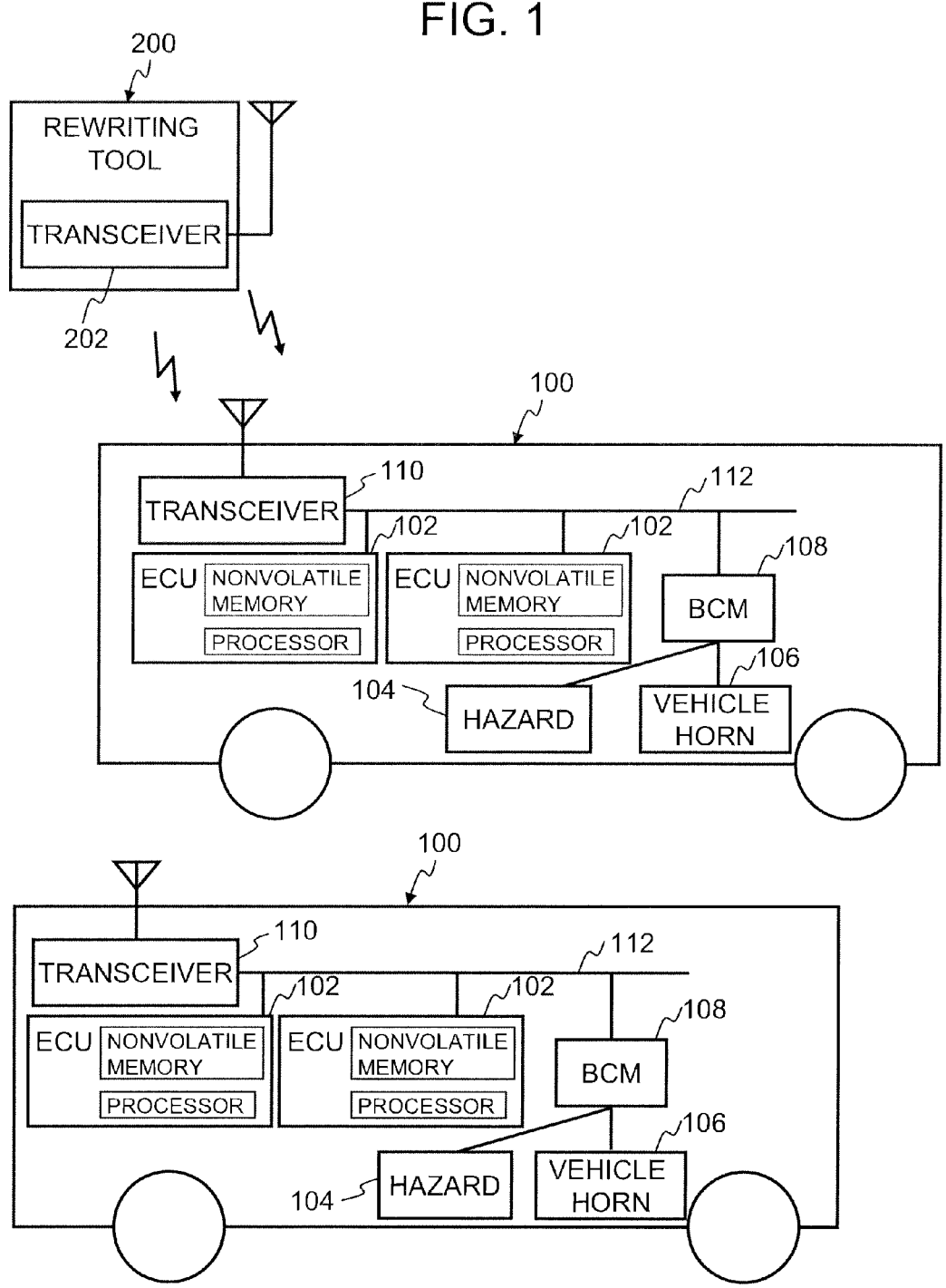
FIG. 1 is a view illustrating the outline of an example of a data rewriting system.

FIG. 1 illustrates an example of a data rewriting system for rewriting data on an in-vehicle electronic control unit.

Plural electronic control units (ECUs) 102 for controlling an engine, an automatic transmission, and the like are installed in a vehicle 100. Each electronic control unit 102 includes a microcomputer, in which a CPU (Central Processing Unit (processor)), a ROM, a RAM (Random Access Memory), I/O (Input/Output), and the like are incorporated, and a nonvolatile memory, such as an EEPROM or a flash ROM, capable of rewriting data electrically. Electronic control unit 102 performs arithmetic processing on signals from various sensors according to a program stored in the nonvolatile memory to output an operation signal to the engine, the automatic transmission, or the like.

Vehicle 100 is also equipped with various electric parts, such as hazard lights 104 as exterior lights, a vehicle horn 106 as an alarm horn, and the like. The various electric parts are controlled by a BCM (Body Control Module) 108.

Furthermore, vehicle 100 is equipped with a transceiver 110 for performing radio communication with external devices outside of the vehicle. Electronic control unit 102, BCM 108, and transceiver 110 are connected in a manner to be communicable with one another through an in-car network 112 such as CAN (Controller Area Network).

A rewriting tool 200 is provided as an example of an external device outside of the vehicle to perform radio communication with transceiver 110 of vehicle 100. Rewriting tool 200 has a built-in transceiver 202 for transmitting and receiving data by radio. Rewriting tool 200 is an apparatus including input and output devices such as a monitor and keyboard, transceiver 202, and a microcomputer for controlling the input and output devices, which can be made up with a notebook-size personal computer, for example.

When data on electronic control unit 102 of vehicle 100 is to be rewritten, rewrite data is stored, for example, in a rewritable memory of rewriting tool 200, and an operator manipulates rewriting tool 200 accordingly to do the rewriting task. Note that rewriting tool 200 is an apparatus technically manipulated by an operator at a maintenance factory or a dealer to rewrite data on electronic control unit 102 of vehicle 100, which may be implemented by installing software on a general-purpose computer or as a dedicated apparatus.

Here, transceiver 110 of vehicle 100 and transceiver 202 of rewriting tool 200 can perform radio communication with each other while freely switching among broadcast communication, multicast communication, and unicast communication.

Figure 2:
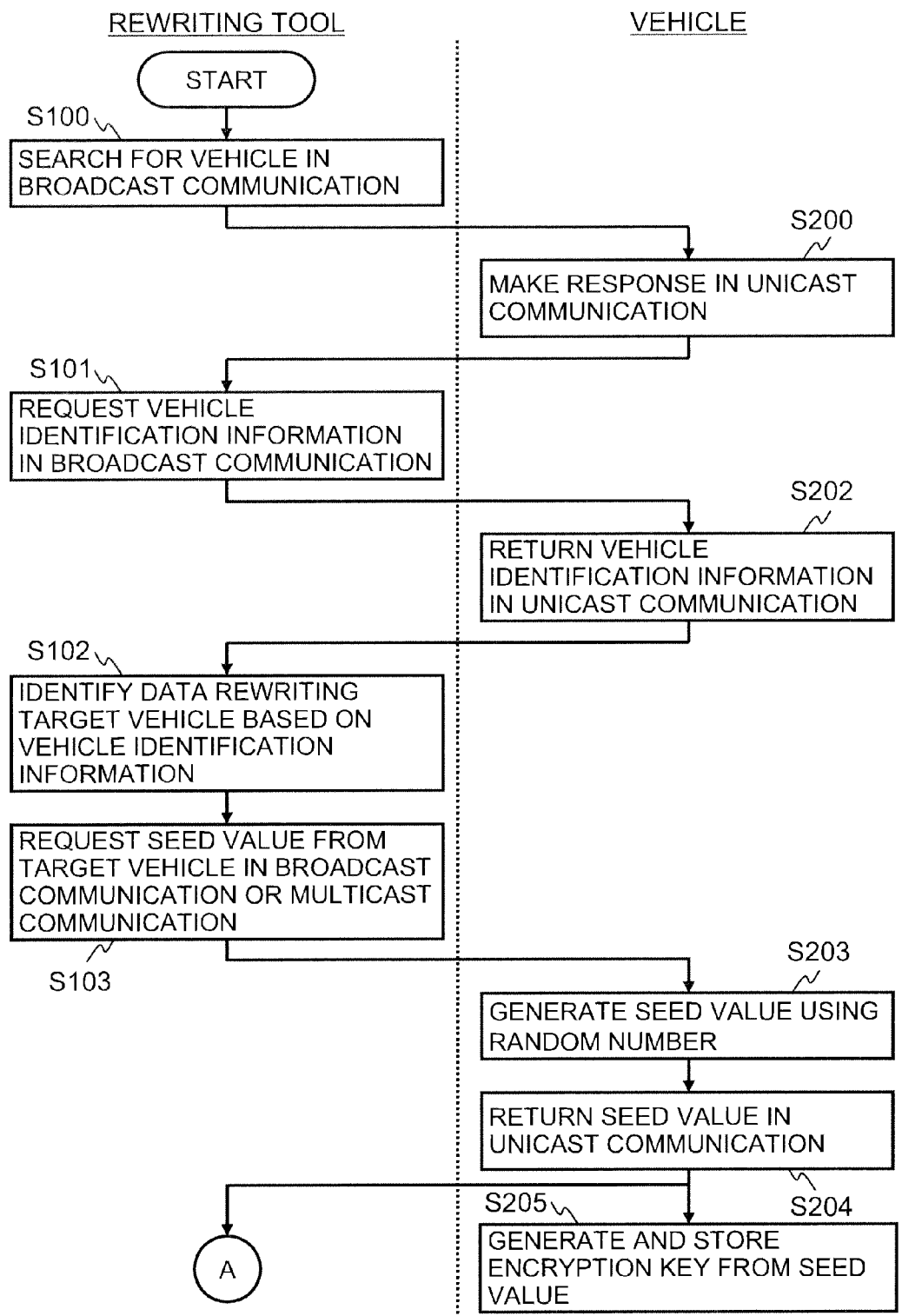
FIG. 2 is a flowchart illustrating an example of data rewrite processing.
Figure 3:
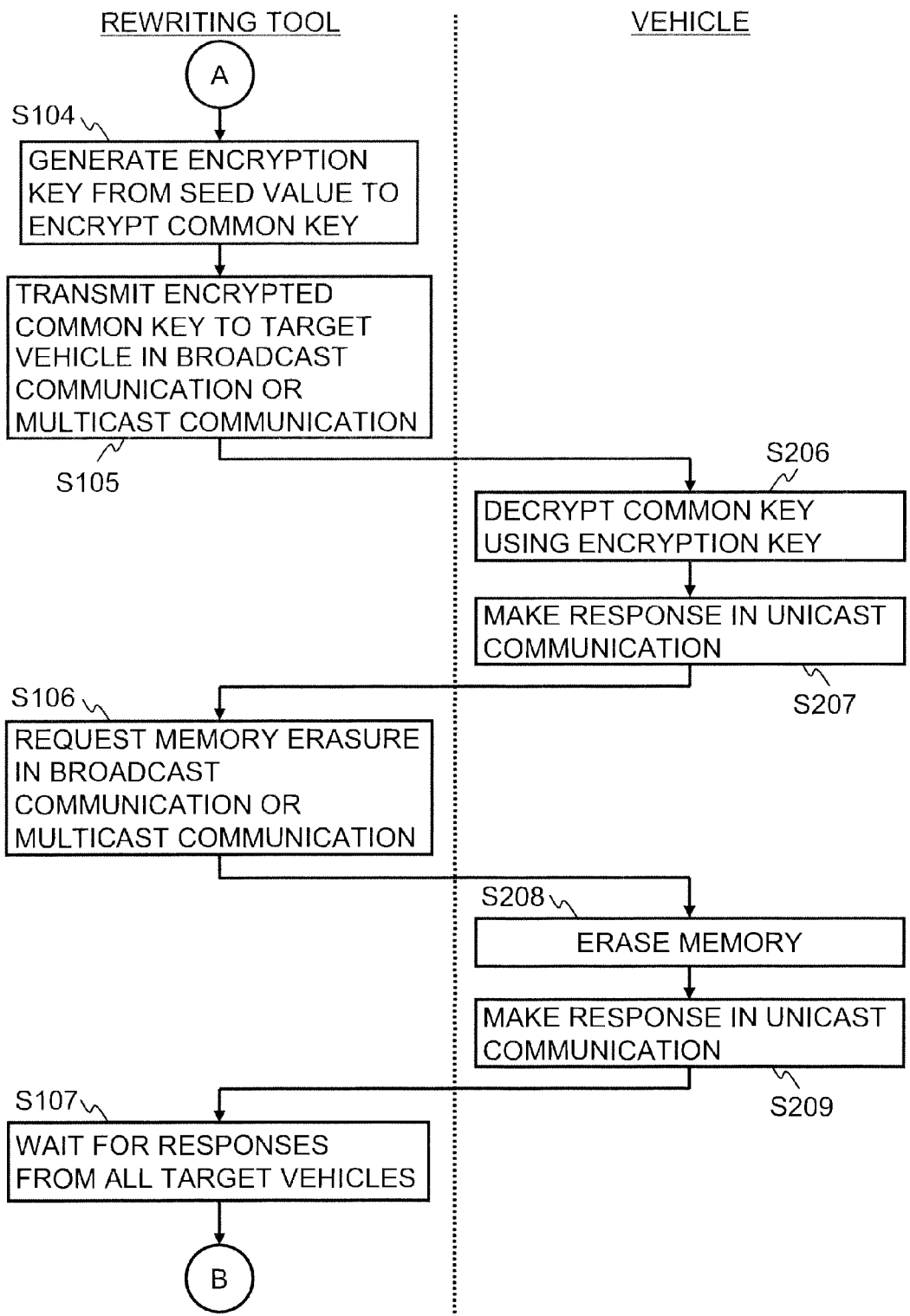
FIG. 3 is a flowchart illustrating the example of data rewrite processing.
Figure 4:
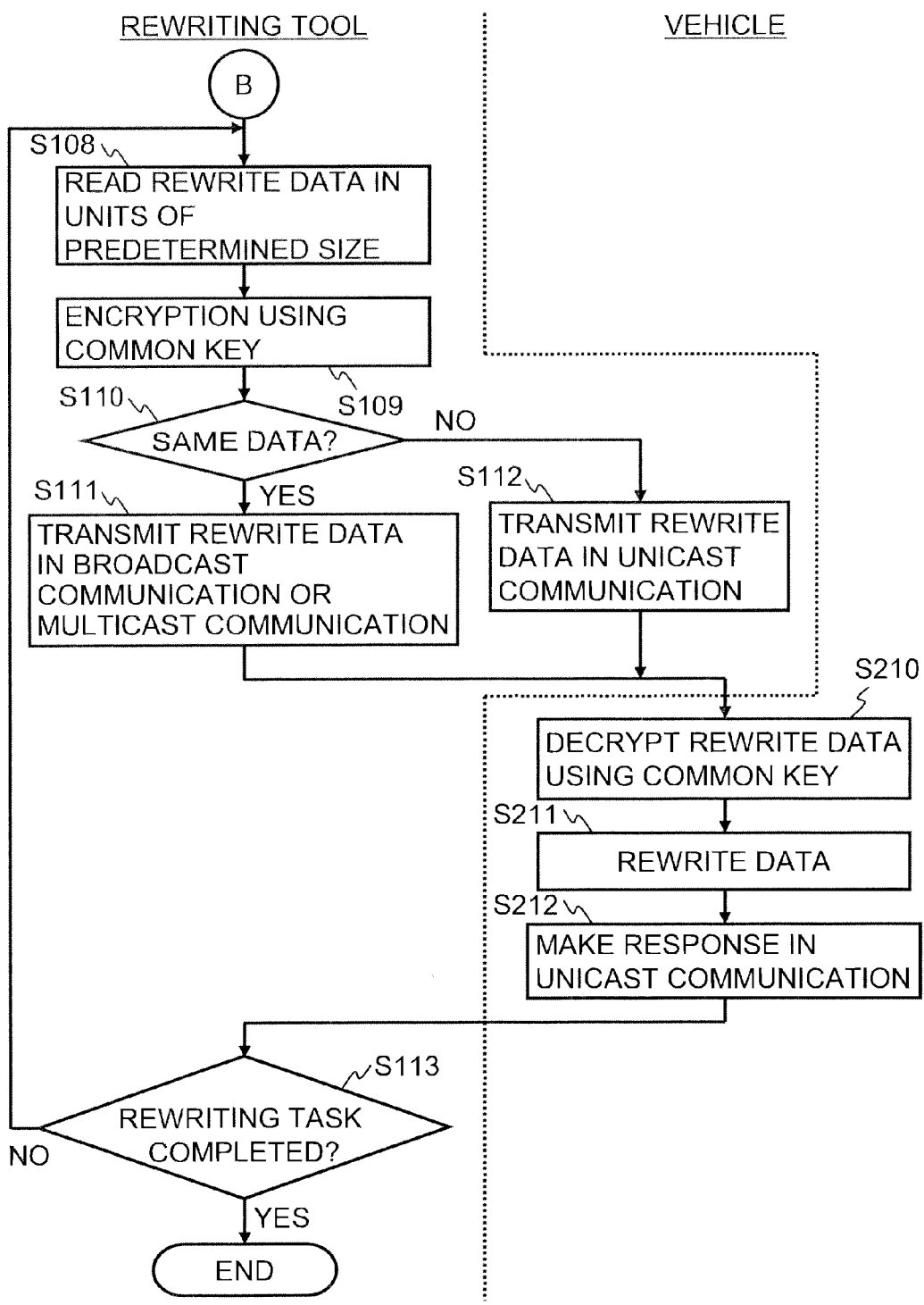
FIG. 4 is a flowchart illustrating the example of data rewrite processing.

FIG. 2 to FIG. 4 illustrate an example of data rewrite processing for rewriting data on electronic control unit 102 installed in vehicle 100 by using rewriting tool 200. The following description assumes that multiple vehicles 100 as data rewriting targets are packed together in a motor pool, a transport container, or the like to rewrite data on these vehicles 100 concurrently. Note that vehicles 100 that are not data rewriting targets may be mixed in the motor pool, the transport container, or the like.

Before starting the task, the operator turns on a key switch of each of the data rewriting target vehicles 100 to power on electronic control unit 102, transceiver 110, and the like as a control system of vehicle 100. This can exclude vehicles 100 that are not data rewriting targets from data rewriting targets even when the vehicles 100 are mixed in a radio communicable range of rewriting tool 200.

When the operator starts an engine of vehicle 100 before starting the task, the battery can be prevented from running out in the middle of the task even if it takes a long time to do the data rewriting task. Thus, the fact that the engine is in operation can also be a precondition for data rewriting. In this case, however, if the engine is automatically started by a drop of battery voltage in a hybrid vehicle, the operator will have only to turn the key switch on.

Furthermore, while transceiver 110 of vehicle 100 is in a communication standby state in which power is always supplied, when it receives a communication from rewriting tool 200, power supply to electronic control unit 102 may be started or the engine may be automatically started. In this case, the operator does not need to work on each vehicle 100 individually, and this enables the operator to start the rewriting task immediately, thereby enhancing the work efficiency.

Furthermore, transceiver 110 may be removable from vehicle 100. In this case, the operator has just to attach transceiver 110 to vehicle 100 as a data rewriting target to eliminate any problem even if vehicles 100 that are not data rewriting targets are mixed in the motor pool or the like.

Note that the embodiment may be applied to electric vehicles and the like as well as vehicle 100 with an engine.

When such a preparatory process is completed, first, rewriting tool 200 transmits a response command to multiple vehicles 100 in broadcast communication in which no radio communication partners are specified to search for vehicles 100 existing in a communicable range (step S100). The search for vehicles 100 is made in such a manner that the operator manipulates rewriting tool 200 to order the start of the vehicle search.

When transceiver 110 of vehicle 100 receives the response command, transceiver 110 transmits, to rewriting tool 200, a response to the response command in unicast communication in which one radio communication partner is specified (step S200).

Figure 5:
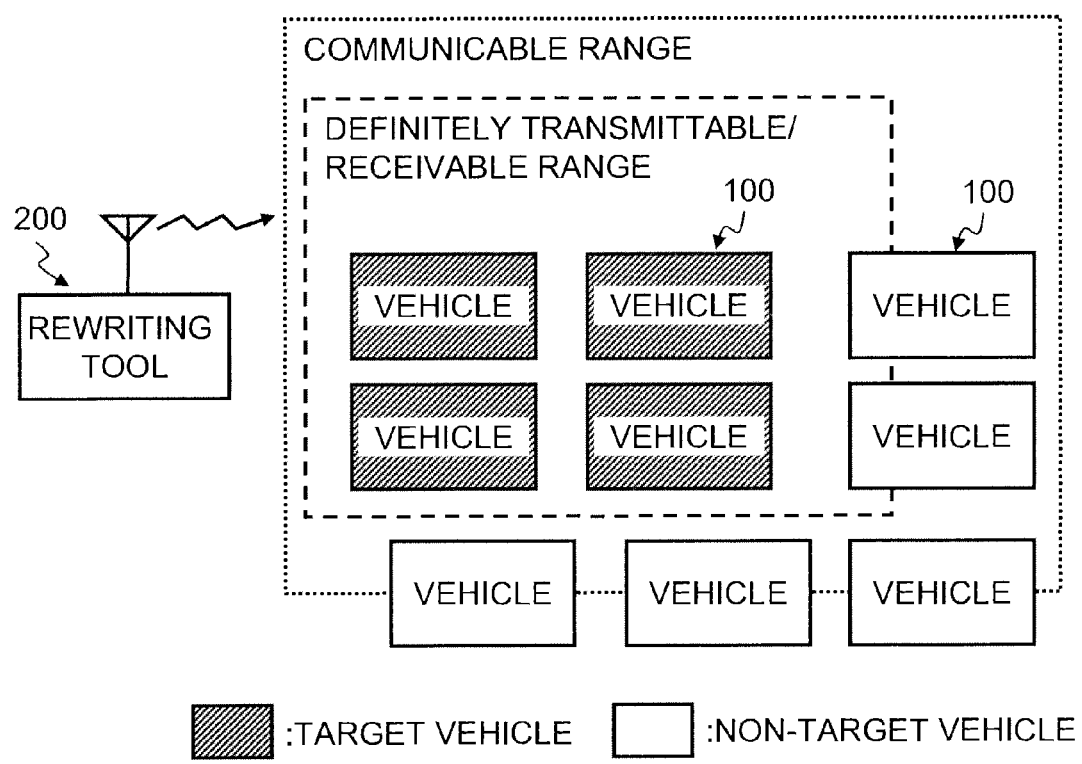
FIG. 5 is a view illustrating a relationship between a communicable range and target vehicles/non-target vehicles.

Here, rewriting tool 200 that received the response to the response command may make the following determinations: When the level (intensity) of radio waves transmitted from vehicle 100 is equal to or greater than a threshold, all vehicles 100 that meet such a condition are specified as rewriting target candidates. On the other hand, when the level of radio waves transmitted from vehicle 100 is less than the threshold even in a communicable state, rewriting tool 200 determines that reliable transmission and reception is difficult and hence is allowed to exclude the vehicle from the rewriting target candidates (see FIG. 5). The threshold is preset as the minimum allowable value for the level of radio waves capable of transmitting and receiving data stably. This can avoid failing in data rewriting depending on the communication state, allowing rewriting tool 200 to carry out the data rewriting task without fail.

Figure 6:
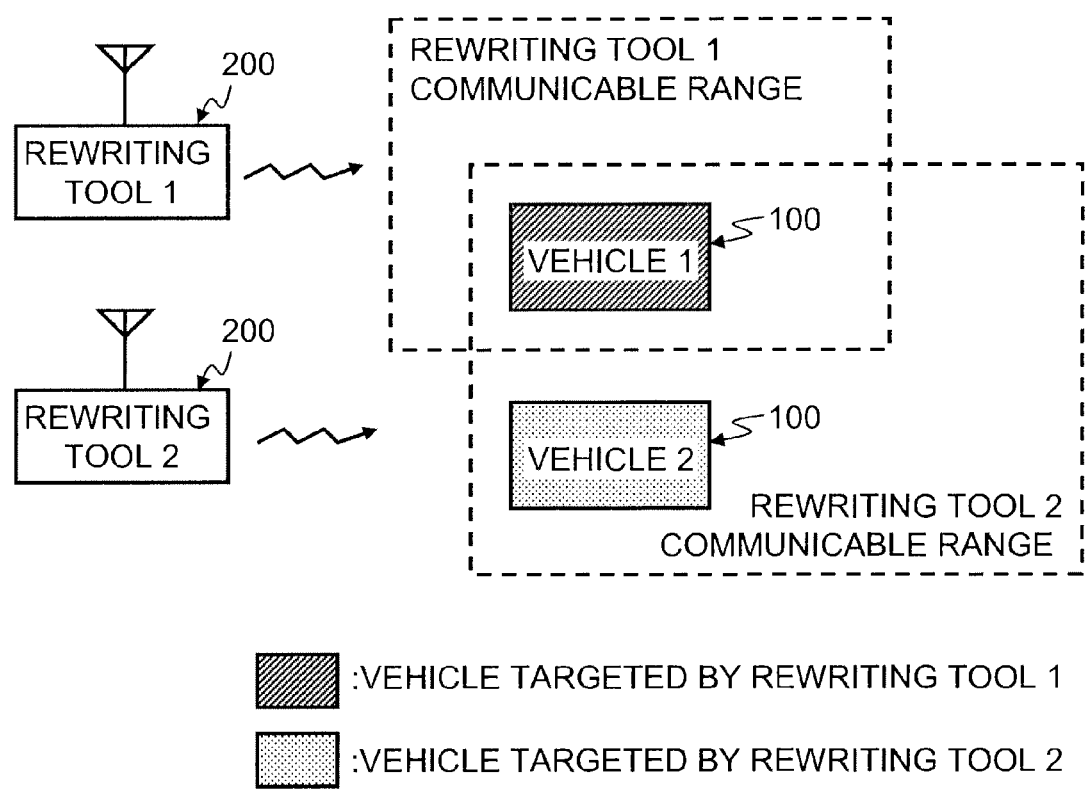
FIG. 6 is a view illustrating a relationship between overlapping of communicable ranges and target vehicles.

Furthermore, when two or more rewriting tools 200 are arranged in a distributed manner and operated concurrently, there is a case in which vehicles 100 exist in a region in which communicable ranges of two or more rewriting tools 200 overlap. In this case, priority is given to rewriting tool 200 first starting communication with a certain vehicle 100, and when another rewriting tool 200 tries to communicate later, transceiver 110 of vehicle 100 may not make a response thereto and exchange data only with rewriting tool 200 first starting radio communication (see FIG. 6). Thus, when two or more rewriting tools 200 are arranged in a distributed manner to carry out concurrent tasks because the number of vehicles 100 is too large, even if certain vehicle 100 is located within communicable ranges of two or more rewriting tools 200, one rewriting tool 200 can be identified as a communication partner to transmit and receive data without fail.

Furthermore, when transceiver 110 of vehicle 100 receives signals from two or more rewriting tools 200, it can identify, as the communication partner, rewriting tool 200 transmitting a signal highest in the level of radio waves, i.e., nearest rewriting tool 200 can be identified as the communication partner.

Rewriting tool 200 that received a response to the response command from vehicle 100 requests, in broadcast communication, vehicle identification information to vehicle 100 that made the response (step S101).

Transceiver 110 of vehicle 100 that received the request for vehicle identification information returns vehicle identification information to rewriting tool 200 in unicast communication (step S202). The vehicle identification information may be a single piece of information, such as the vehicle license number, the vehicle identification number, the type of vehicle, or the data structure of electronic control unit 102, or a combination of plural pieces of information. The vehicle identification information may be prestored for each vehicle 100, for example, in transceiver 110 or electronic control unit 102.

Rewriting tool 200 that received the vehicle identification information identifies vehicles 100 as data rewriting targets based on the vehicle identification information (step S102). Specifically, the operator uses a keyboard and the like to enter information on data rewriting target vehicles in advance into rewriting tool 200. Then, rewriting tool 200 compares the information on data rewriting target vehicles with vehicle identification information sent from vehicles 100 to identify vehicles 100 as as data rewriting targets. In other words, the consistency between the rewrite data and the vehicle identification information (vehicle information) is checked, and when they are consistent, the communication of the rewrite data is started in a manner to be described later. Thus, although vehicles 100 that are not data rewriting targets may be mixed in the vehicles 100 searched for in step S100, since the rewriting target candidates are narrowed down based on the vehicle identification information to exclude the vehicles 100 from data rewriting targets, no problem arises.

For example, when rewrite data is downloaded from a host computer, rewriting tool 200 may also download together information on data rewriting target vehicles to which the rewrite data is applied. Furthermore, information on data rewriting target vehicles may also be integrally attached to the rewrite data.

When identifying data rewriting target vehicles, rewriting tool 200 may transmit information indicative of being identified as the target vehicles to each vehicle 100, so that transceiver 110 of vehicle 100 that received this information instructs BCM 108 to put hazard lights 104 on, actuate vehicle horn 106, or the like. Thus, the operator can easily identify vehicle 100 specified as a target vehicle from among multiple vehicles 100 placed side by side in the motor pool. For example, the operator becomes aware of vehicle 100 with which rewriting tool 200 did not communicate because the operator forgot to turn the key switch on despite the fact that vehicle 100 should have been a target vehicle, allowing the operator to turn the key switch on anew.

Instead of hazard lights 104, other exterior lights such as headlights, rear lights, or brake lights can be put on, and instead of vehicle horn 106, the alarm of an antitheft device can be actuated. Furthermore, instead of flashing lights or sound to make the operator become aware of a target vehicle, the movement of vehicle parts can make the operator become aware of the target vehicle. Specifically, wipers can be actuated or an automatic opening and closing device can be used to open or close a door or a window to make the operator identify, as a state change of an individual vehicle, vehicle 100 selected as a target vehicle.

Here, various exterior lights including hazard lights 104, vehicle horn 106, the antitheft device, the wipers, and the automatic opening and closing device are all electric parts, but the electric parts to be actuated are not limited thereto.

Rewriting tool 200 that identified data rewriting target vehicles requests a seed value for encryption to the target vehicles through broadcast communication or multicast communication in the case of identifying multiple communication partners so as to ensure the security of communication (step S103). Here, broadcast communication is used when all vehicles 100 searched for are target vehicles, and multicast communication is used when vehicle(s) 100 that is not a target vehicle(s) is included in the vehicles 100 searched for.

Transceiver 110 of vehicle 100 that received the request for a seed value generates a seed value using a random number (step S203).

Transceiver 110 of vehicle 100 that generated the seed value returns the generated seed value to rewriting tool 200 in unicast communication (step S204).

Furthermore, transceiver 110 of vehicle 100 generates an encryption key from the generated seed value and stores the encryption key (step S205).

Rewriting tool 200 that received the seed value generates an encryption key from the seed value in the same manner as transceiver 110 of vehicle 100 to encrypt a predetermined common key (step S104). Here, since the encryption key is generated in the same manner as that of transceiver 110 of vehicle 100, vehicle 100 and rewriting tool 200 can share the encryption key. Then, rewriting tool 200 transmits the encrypted common key to the target vehicles in broadcast communication or multicast communication (step S105).

Transceiver 110 of vehicle 100 that received the common key decrypts the common key using the encryption key (step S206). Then, transceiver 110 of vehicle 100 returns, to rewriting tool 200, a response in unicast communication to indicate that the common key is able to be decrypted (step S207).

After decrypting the common key, transceiver 110 may deliver this common key to each electronic control unit 102. This enables each electronic control unit 102 to decrypt encrypted data. Furthermore, the common key may be decrypted by each electronic control unit 102, rather than by transceiver 110.

Rewriting tool 200 that received the response indicating that the common key is able to be decrypted makes a request to the target vehicles for memory erasure through broadcast communication or multicast communication (step S106). Included in the request for memory erasure are information for identifying electronic control unit 102, information for specifying an erasure range in the nonvolatile memory of electronic control unit 102, and the like. These pieces of information may be specified, for example, from information on data rewriting target vehicles entered by the operator. Note that the memory erasure is processing performed prior to data rewriting.

Transceiver 110 of vehicle 100 that received the memory erasure request identifies at least one electronic control unit 102, which is subjected to memory erasure, based on the information included in the request, and transfers, to the electronic control unit 102, the memory erasure request including the information for specifying the erasure range. Then, electronic control unit 102 that received the memory erasure request erases the memory in the erasure range (step S208). Upon completion of the memory erasure, electronic control unit 102 returns a response indicative of completion of the memory erasure to rewriting tool 200 through transceiver 110 in unicast communication (step S209). Note that electronic control unit 102 and rewriting tool 200 may check with each other regarding the progress status of the memory erasure.

On the other hand, rewriting tool 200 waits until responses including completion of memory erasure are returned from all the target vehicles (step S107).

Furthermore, rewriting tool 200 sequentially reads fragmented pieces of rewrite data stored in the memory in units of a predetermined size (e.g., 128 bytes) (step S108) to encrypt the predetermined size of rewrite data using the common key (step S109). After that, for example, rewriting tool 200 refers to the information on data rewriting target vehicles to determine whether the encrypted rewrite data is same data to the target vehicles (step S110). Then, when determining that it is same data to the target vehicles, rewriting tool 200 transmits the encrypted rewrite data to vehicles 100 in broadcast communication or multicast communication (step S111). On the other hand, when determining that it is not same data to the target vehicles, i.e., that it is unique data specific to each vehicle 100, rewriting tool 200 transmits, in unicast communication, the encrypted rewrite data to vehicle 100 to which the unique data is to be applied (step S112).

Transceiver 110 of vehicle 100 that received the rewrite data identifies, based on information included in the rewrite data, electronic control unit 102 to which the rewrite data is applied, and transfers the rewrite data to the electronic control unit 102. Electronic control unit 102 that received the rewrite data decrypts the rewrite data using the common key (step S210) and writes the rewrite data sequentially into an area to which the rewrite data is applied (step S211). Upon completion of writing the rewrite data, electronic control unit 102 returns a response indicative of completion of data writing to rewriting tool 200 through transceiver 110 in unicast communication (step S212).

Here, when electronic control unit 102 of vehicle 100 has not received rewrite data from rewriting tool 200 for a predetermined time, the data rewrite processing may be stopped. In this case, for example, when a radio disturbance occurs, since the data rewrite processing is stopped, such a situation that the data rewrite processing is never ended can be avoided.

Rewriting tool 200 that received the response indicative of completion of data writing determines, for example, whether the last piece of rewrite data stored in the memory is processed to determine whether the rewriting task is completed (step S113). Then, when determining that the rewriting task is completed, rewriting tool 200 ends the task, while when determining that the rewriting task is not completed, the processing starting from step S108 is repeated.

When the rewriting task is completed, electronic control unit 102 of vehicle 100 determines whether data is rewritten normally, and according to the determination result, it may instruct BCM 108 to actuate electric parts. This enables the operator to distinguish vehicles 100 with data rewriting performed normally from vehicles 100 failing in data rewriting among vehicles 100 placed side by side in the motor pool or the like.

Vehicle 100 failing in data rewriting may be notified to rewriting tool 200, so that rewriting tool 200 performs data rewrite processing again through unicast communication. In this case, the repetition of data rewrite processing may be limited to a given number of times or fewer, and when rewriting is not completed normally after the data rewrite processing is repeated the given number of times, the data rewrite processing is stopped to make rewriting tool 200 display that vehicle 100 concerned is unable to rewrite data. This allows the operator manipulating rewriting tool 200 to become aware of vehicle 100 failing in data rewriting. Note that since there is a possibility that data rewrite processing has failed due to radio interference, rewriting tool 200 and vehicle 100 may be connected by cable to perform data rewriting again.

According to this data rewriting system, rewriting tool 200 searches for vehicles 100 through broadcast communication to make a request to the vehicles 100 for vehicle identification information. After that, based on vehicle identification information, the rewriting tool 200 identifies vehicles 100 as data rewriting targets from among vehicles 100 searched for, and generates a common key for communicating with the vehicles 100 to be transmitted. Furthermore, rewriting tool 200 makes a request to vehicles 100 as the data rewriting targets for memory erasure in a data rewriting area, and waits for responses from all vehicles 100 as the data rewriting targets. Then, rewriting tool 200 uses the common key to encrypt rewrite data divided by predetermined size, and sequentially transmits the rewrite data in synchronization with vehicle 100 to ensure the communication of the rewrite data. At this time, when the rewrite data is the same data in all vehicles 100 as the data rewriting targets, rewriting tool 200 transmits the encrypted rewrite data in broadcast communication or multicast communication, whereas when it is unique data specific to each vehicle 100 as a data rewriting target, rewriting tool 200 transmits the encrypted rewrite data in unicast communication.

On the other hand, when receiving the memory erasure request from rewriting tool 200, vehicle 100 erases the memory based on information for specifying the erasure range included in the request. Furthermore, when receiving rewrite data from rewriting tool 200, vehicle 100 decrypts the rewrite data using the common key to rewrite data in an area to which the rewrite data is to be applied.

Thus, same data to multiple vehicles 100 are rewritten through broadcast communication or multicast communication, while unique data specific to each vehicle 100 is rewritten through unicast communication. Therefore, even when the capacity of the nonvolatile memory in which the data is rewritten is increased in electronic control unit 102 of vehicle 100, since data rewriting of same data is performed in parallel through broadcast communication or multicast communication, data rewriting efficiency can be enhanced. Although data rewriting of unique data is performed through unicast communication, when unique data in the data structure of electronic control unit 102 is only a small portion, such as the same vehicle model or the same series of vehicle type, data rewriting efficiency is not so degraded. Since such an effect is exerted more greatly as the number of vehicles 100 that are data rewriting targets increases, this will be particularly valuable to automobile manufacturers that perform data rewriting on a very large number of vehicles 100.

While data rewriting is being performed on a nonvolatile memory in electronic control unit 102 of vehicle 100, this electronic control unit cannot communicate with another electronic control unit 102, and hence abnormality information detected by an abnormality diagnosis function is accumulated. In this case, rewriting tool 200 may transmit, in unicast communication, a command for erasing abnormality information to vehicle 100 in which data rewriting is completed normally. This enables electronic control unit 102 of vehicle 100 to erase abnormality information accumulated during data rewriting in response to the command transmitted from rewriting tool 200.

Note that various processing performed by transceiver 110 of vehicle 100 in the aforementioned embodiment may be performed by each electronic control unit 102 installed in the vehicle 100. In this case, transceiver 110 has only the function of transmitting and receiving data, commands, and the like to and from rewriting tool 200.

A specific example will be described for the sake of facilitating understanding of the aforementioned embodiment.

Figure 7:
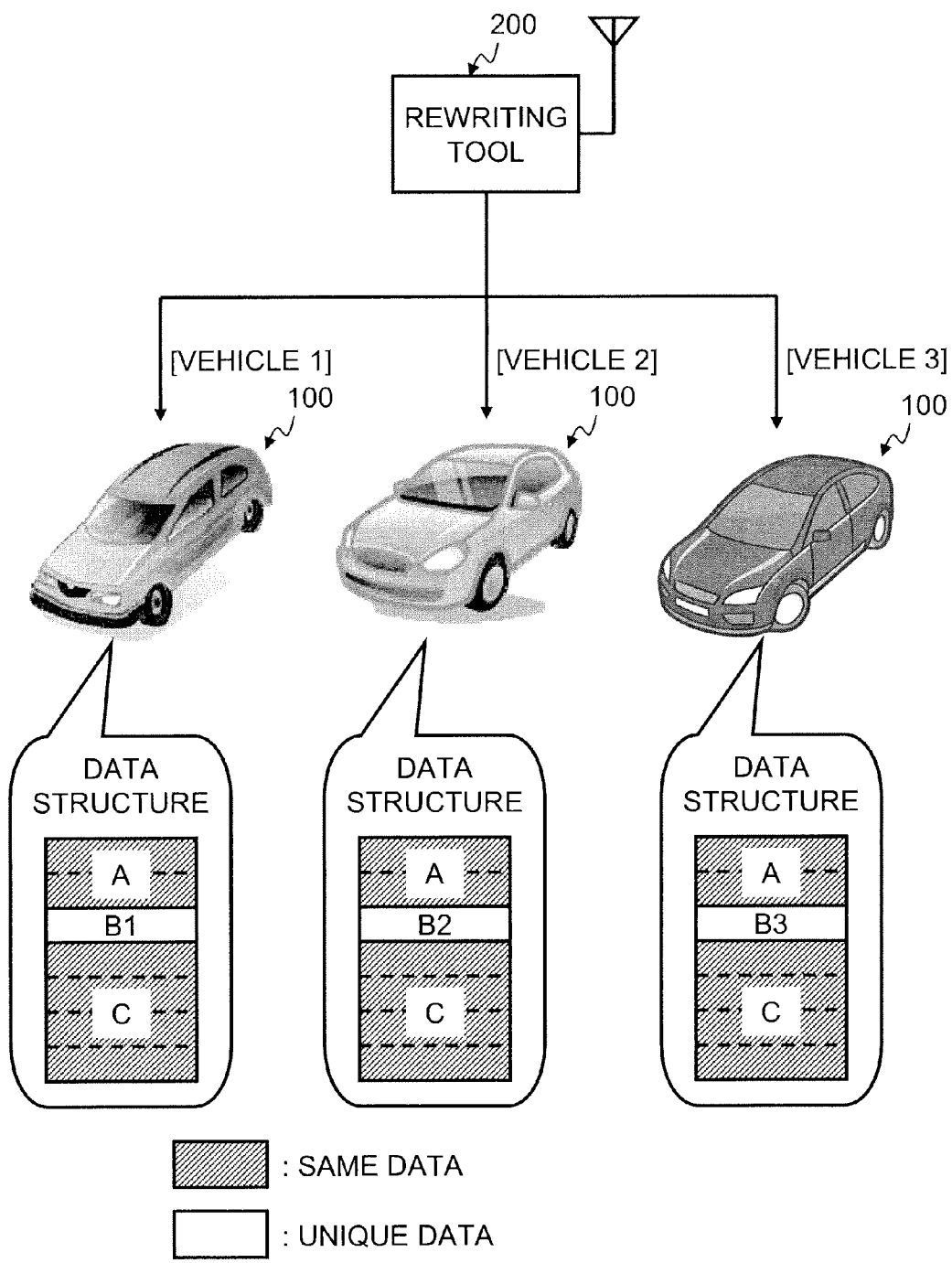
FIG. 7 is a view describing preconditions in a specific example.

FIG. 7 illustrates a specific example in which rewriting tool 200 rewrites data on three vehicles 100 (vehicle 1 to vehicle 3) packed together in a motor pool. It is assumed that the data structures in electronic control units 102 of vehicle 1 to vehicle 3 consist of same data A and C, and unique data B1 to B3 as shown in FIG. 7. Note that the following description will be made of only main processing and other processing such as that for ensuring security will be omitted.

Figure 8:
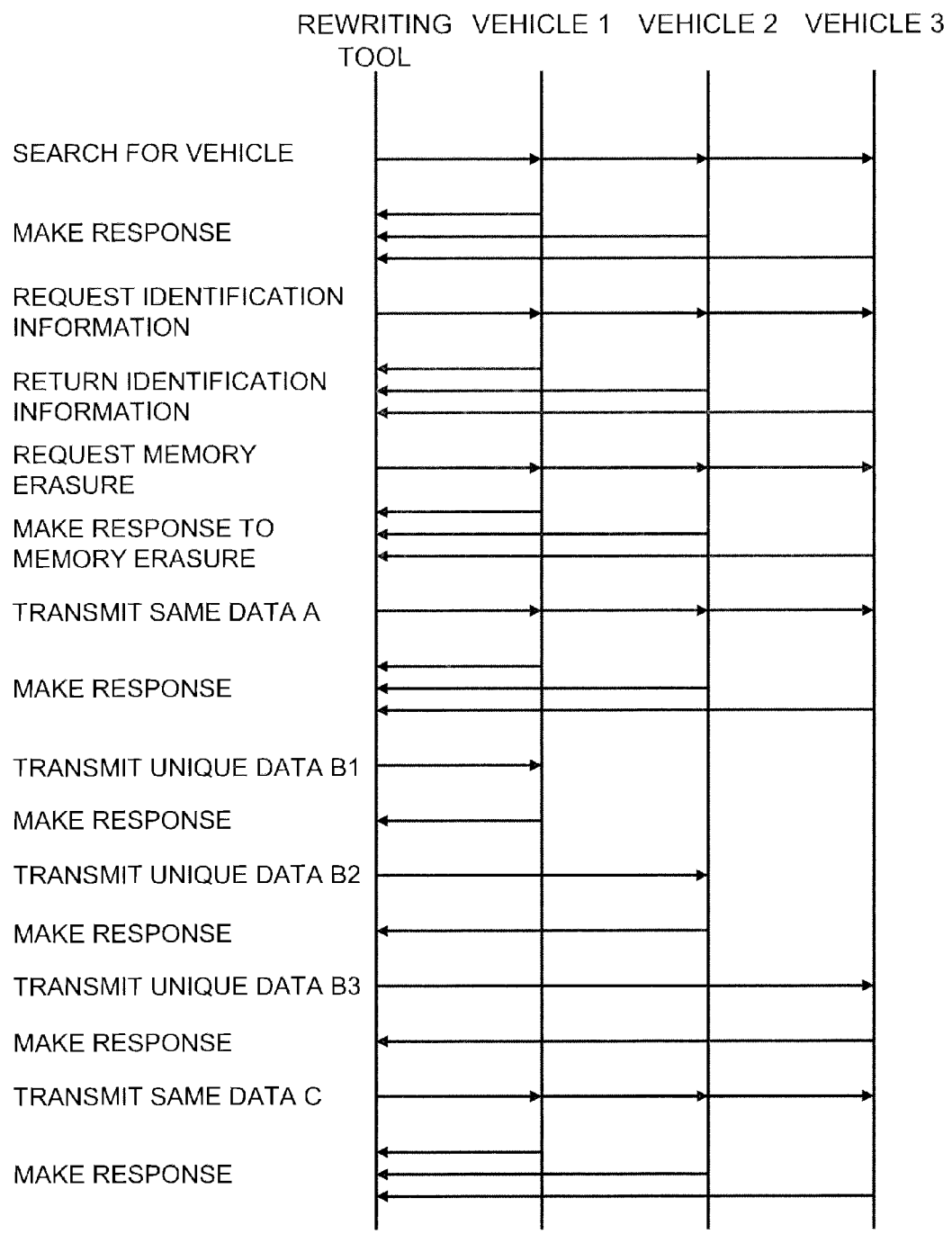
FIG. 8 is a view describing the outline of data rewrite processing in the example.

As shown in FIG. 8, rewriting tool 200 transmits a response command in broadcast communication to search for vehicles 100 existing in the motor pool. Vehicle 1 to vehicle 3 that received the response command make a response through unicast communication. Rewriting tool 200 that received this response makes a request to vehicle 1 to vehicle 3 for vehicle identification information through broadcast communication. Vehicle 1 to vehicle 3 that received the request for vehicle identification information return vehicle identification information in unicast communication. After that, rewriting tool 200 makes a request to vehicle 1 to vehicle 3 for memory erasure through broadcast communication. Vehicle 1 to vehicle 3 that received the request for memory erasure erase the memory in a predetermined area of electronic control unit 102, and return a response indicative of completion of the memory erasure in unicast communication.

Rewriting tool 200 analyzes the data structures of vehicle 1 to vehicle 3, and first transmits same data A to vehicle 1 to vehicle 3 in broadcast communication. Vehicle 1 to vehicle 3 that received same data A rewrite data on electronic control unit 102 based on same data A, and make a response in unicast communication. Rewriting tool 200 that received this response transmits unique data B1 to vehicle 1 in unicast communication because data following same data A in vehicle 1 to vehicle 3 are unique data. Vehicle 1 that received unique data B1 rewrites data in electronic control unit 102 based on unique data B1, and makes a response in unicast communication. Rewriting tool 200 also transmits unique data B2 to vehicle 2 in unicast communication, and vehicle 2 that received this rewrites data in electronic control unit 102, and makes a response in unicast communication. Furthermore, rewriting tool 200 transmits unique data B3 to vehicle 3 in unicast communication, and vehicle 3 that received this rewrites data in electronic control unit 102 and makes a response in unicast communication.

After that, since data following unique data B1 to B3 in vehicle 1 to vehicle 3 is same data C, rewriting tool 200 transmits same data C to vehicle 1 to vehicle 3 in broadcast communication. Vehicle 1 to vehicle 3 that received same data C rewrite data in electronic control unit 102 based on same data C, and make a response in unicast communication.

Thus, according to this example, since same data A and C in electronic control unit 102 of vehicle 1 to vehicle 3 are rewritten in parallel through broadcast communication, it will be understood that data rewriting efficiency is enhanced.

The entire contents of Japanese Patent Application No. 2012-063833, filed Mar. 21, 2012, are incorporated herein by reference.

While only a select embodiment has been chosen to illustrate the present invention, it will be apparent to those skilled in the art from this disclosure that various changes and modifications can be made herein without departing from the scope of the invention as defined in the appended claims.

Furthermore, the foregoing descriptions of the embodiments according to the present invention are provided for illustration only, and not for the purpose of limiting the invention, the invention as claimed in the appended claims and their equivalents.

What is claimed is:

1. An automotive electronic control unit comprising:
   a nonvolatile memory which stores data; and
   a processor which receives rewrite data wirelessly transmitted in units of a predetermined size from an external device by switching between broadcast communication and unicast communication, or between multicast communication and unicast communication, and rewrites data stored in the nonvolatile memory with the rewrite data, wherein:
   the rewrite data comprises first rewrite data and second rewrite data,
   the first rewrite data is common among a plurality of automobiles, and
   the second rewrite data is unique to each automobile of the plurality of automobiles;
   the electronic control unit is configured to:
   receive the first rewrite data sent by the external device to the plurality of automobiles in broadcast communication or multicast communication,
   receive the second rewrite data sent by the external device to an automobile of the plurality of automobiles in unicast communication,
   receive a request for a seed value for encryption, wherein the request for the seed value is provided through broadcast communication from the external device when all automobiles searched for by the external device are targets for rewriting, and through multicast communication when automobiles searched for by the external device include automobiles which are targets for rewriting and at least one automobile which is not a target for rewriting, wherein the seed value is used to generate a common key to facilitate encrypted communications,
   receive the common key to facilitate encrypted communications, wherein the common key is sent by the external device in broadcast communication or multicast communication, and
   following rewriting of the data in the nonvolatile memory with the rewrite data, provide a response for transmission to the external device in unicast communication.

2. The automotive electronic control unit according to claim 1, wherein
   the processor is configured to make a comparison between the rewrite data and vehicle information, and communication of the rewrite data is started based on a result of the comparison.

3. The automotive electronic control unit according to claim 1, wherein the rewrite data is communicated to an automobile identified by vehicle information.

4. The automotive electronic control unit according to claim 1, wherein the automotive electronic control unit is powered on before data is rewritten.

5. The automotive electronic control unit according to claim 1, wherein the rewrite data is communicated after being encrypted by the common key shared with the external device.

6. The automotive electronic control unit according to claim 1, wherein the rewrite data is received via synchronous communication with the external device.

7. The automotive electronic control unit according to claim 1, wherein when data rewrite processing fails, data stored in the nonvolatile memory is rewritten based on the second rewrite data communicated in unicast communication.

8. The automotive electronic control unit according to claim 1, wherein when the data rewrite processing fails, the external device is notified of the failure.

9. The automotive electronic control unit according to claim 1, wherein when the rewriting of data is normally completed, abnormality information is erased in response to a command communicated in unicast communication.

10. A data rewriting method for an automotive electronic control unit having a nonvolatile memory, comprising:
    receiving rewrite data wirelessly transmitted in units of a predetermined size from an external device by switching between broadcast communication and unicast communication, or between multicast communication and unicast communication; and
    rewriting data stored in the nonvolatile memory with the rewrite data, wherein the rewrite data comprises first rewrite data and second rewrite data, the first rewrite data is common among a plurality of automobiles, and the second rewrite data is unique to each automobile of the plurality of automobiles;
    receiving, by the electronic control unit, the first rewrite data sent by the external device to the plurality of automobiles in broadcast communication or multicast communication;
    receiving, by the electronic control unit, the second rewrite data sent by the external device to an automobile of the plurality of automobiles in unicast communication;
    receiving, by the electronic control unit, a request for a seed value for encryption, wherein the request for the seed value is provided through broadcast communication from the external device when all automobiles searched for by the external device are targets for rewriting, and through multicast communication when automobiles searched for by the external device include automobiles which are targets for rewriting and at least one automobile which is not a target for rewriting, wherein the seed value is used to generate a common key to facilitate encrypted communications;
    receiving, by the electronic control unit, the common key to facilitate encrypted communications, wherein the common key is sent by the external device in broadcast communication or multicast communication; and
    following rewriting of the data in the nonvolatile memory with the rewrite data, providing, by the electronic control unit, a response for transmission to the external device in unicast communication.

11. The data rewriting method for an automotive electronic control unit according to claim 10, further comprising:
  making a comparison between the rewrite data and vehicle information, and
  starting communication of the rewrite data based on a result of the comparison.

12. The data rewriting method for an automotive electronic control unit according to claim 10, wherein the rewrite data is communicated to an automobile identified by vehicle information.

13. The data rewriting method for an automotive electronic control unit according to claim 10, wherein the automotive electronic control unit is powered on before data is rewritten.

14. The data rewriting method for an automotive electronic control unit according to claim 10, wherein the rewrite data is communicated after being encrypted by the common key shared with the external device.

15. The data rewriting method for an automotive electronic control unit according to claim 10, wherein the rewrite data is received via synchronous communication with the external device.

16. The data rewriting method for an automotive electronic control unit according to claim 10, wherein when data rewrite processing fails, the automotive electronic control unit rewrites data stored in the nonvolatile memory based on the second rewrite data communicated in unicast communication.

17. The data rewriting method for an automotive electronic control unit according to claim 10, wherein when the data rewrite processing fails, the automotive electronic control unit notifies the external device of the failure.

18. The data rewriting method for an automotive electronic control unit according to claim 10, wherein when the rewriting of data is normally completed, the automotive electronic control unit erases abnormality information in response to a command communicated in unicast communication.

19. The automotive electronic control unit according to claim 1, wherein the rewrite data comprises encrypted data.

20. The data rewriting method for an automotive electronic control unit according to claim 10, wherein the rewrite data comprises encrypted data.

21. An automotive electronic control system comprising:
  a transceiver configured to:
    receive and transmit rewrite data wirelessly transmitted in units of a predetermined size from an external device by switching between broadcast communication and unicast communication, or between multicast communication and unicast communication, the rewrite data comprising first rewrite data and second rewrite data, the first rewrite data being common among a plurality of automobiles, and the second rewrite data being unique to each automobile of the plurality of automobiles, and
    receive a request for a seed value for encryption from the external device in broadcast communication or multicast communication, wherein the seed value is used to generate a common key to facilitate encrypted communications; and
  an electronic control unit comprising a nonvolatile memory configured to store data, and a processor configured to rewrite data stored in the nonvolatile memory with the rewrite data, the electronic control unit being configured to:
    communicate with the external device via the transceiver,
    receive the common key to facilitate encrypted communications,
    wherein the common key is sent by the external device in broadcast communication or multicast communication,
    provide a response in unicast communication to a response command transmitted by the external device in broadcast communication,
    provide a response in unicast communication to a request for identification information transmitted by the external device in broadcast communication, the response to the request comprising the identification information,
    receive a request for erasure transmitted by the external device in broadcast communication, following the response to the request for identification information,
    erase a portion of the nonvolatile memory in response to the request for erasure following receipt of the request for erasure,
    return a response indicative of completion of erasure to the external device in unicast communication, following erasure of the portion of the nonvolatile memory,
    receive the first rewrite data sent by the external device to the plurality of automobiles in broadcast communication or multicast communication following the response indicative of completion of the erasure, rewrite data in the nonvolatile memory with the first rewrite data, and respond to the external device in unicast communication, and
    receive the second rewrite data sent by the external device to an automobile of the plurality of automobiles in unicast communication, rewrite data in the nonvolatile memory the second rewrite data, and respond to the external device in unicast communication.

* * * * *